United States Patent [19]

Paracchi

[11] 4,043,729
[45] Aug. 23, 1977

[54] APPARATUS FOR SHAPING FLOOR COVERINGS FOR THE INTERIORS OF VEHICLES

[75] Inventor: Antonio Paracchi, Turin, Italy

[73] Assignee: Textilform S.A., Luxembourg

[21] Appl. No.: 656,110

[22] Filed: Feb. 9, 1976

[30] Foreign Application Priority Data

Feb. 17, 1975 Italy .................................. 67400/75

[51] Int. Cl.² ......................... B29C 17/00; B29C 3/02
[52] U.S. Cl. ................................ 425/348 R; 425/384;
425/398; 425/407; 425/409; 425/412; 425/451;
425/453
[58] Field of Search ................... 425/348 R, 398, 409,
425/412, 453, 394, 407, DIG. 201, 383, 340, 348
S, 451, 384

[56] References Cited

U.S. PATENT DOCUMENTS

| 1,344,285 | 6/1920 | Wolff | 425/348 X |
|---|---|---|---|
| 2,183,984 | 12/1939 | Campbell | 425/398 X |
| 3,078,516 | 2/1963 | Trammell, Jr. et al. | 425/394 |
| 3,635,629 | 1/1972 | Saladin | 425/173 |
| 3,816,044 | 6/1974 | Nielsen et al. | 425/385 X |

*Primary Examiner*—Robert L. Spicer, Jr.
*Attorney, Agent, or Firm*—Christie, Parker & Hale

[57] ABSTRACT

Apparatus for hot shaping vehicle floor carpets has a plurality of presses mounted on a slow-moving turntable which carries operators and which can have a central rotary distributor for distributing pressure fluid from a stationary source to actuators on the presses.

11 Claims, 11 Drawing Figures

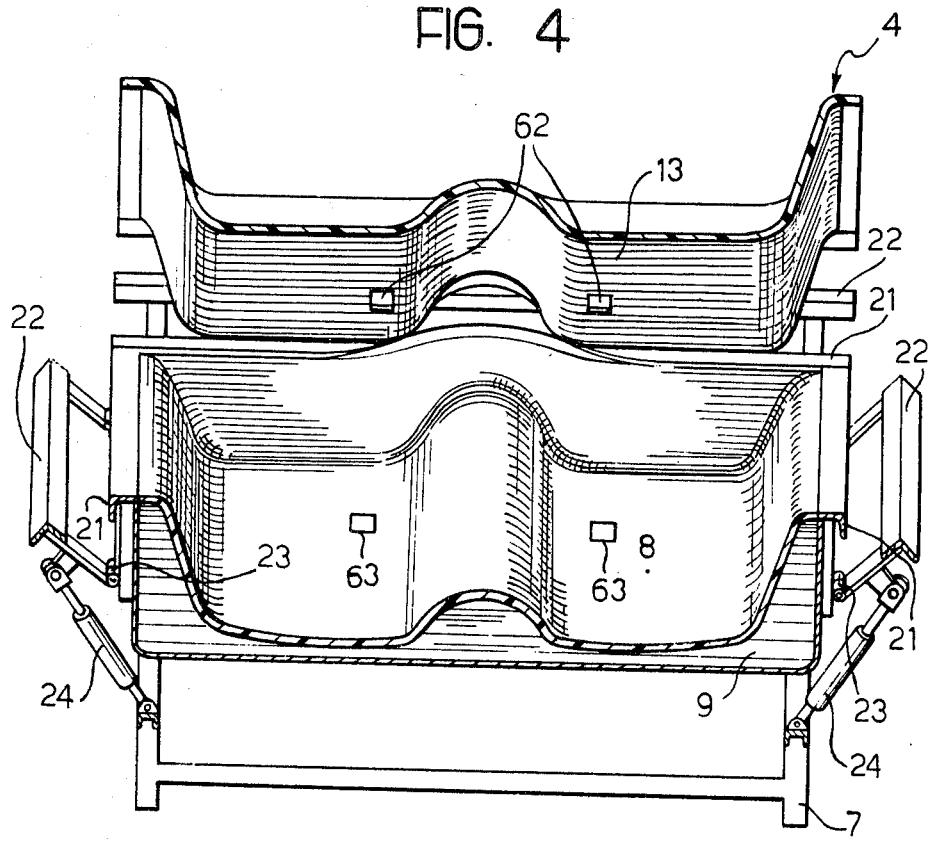
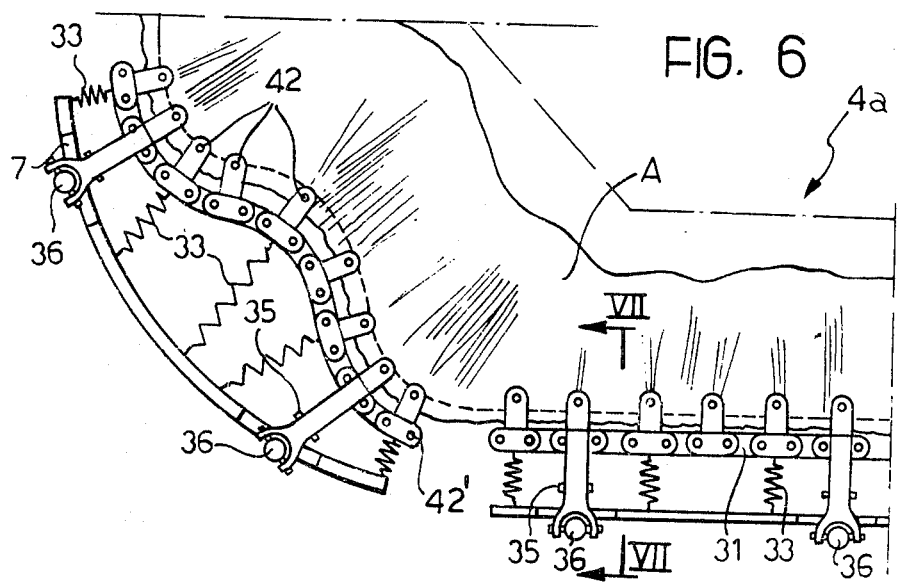

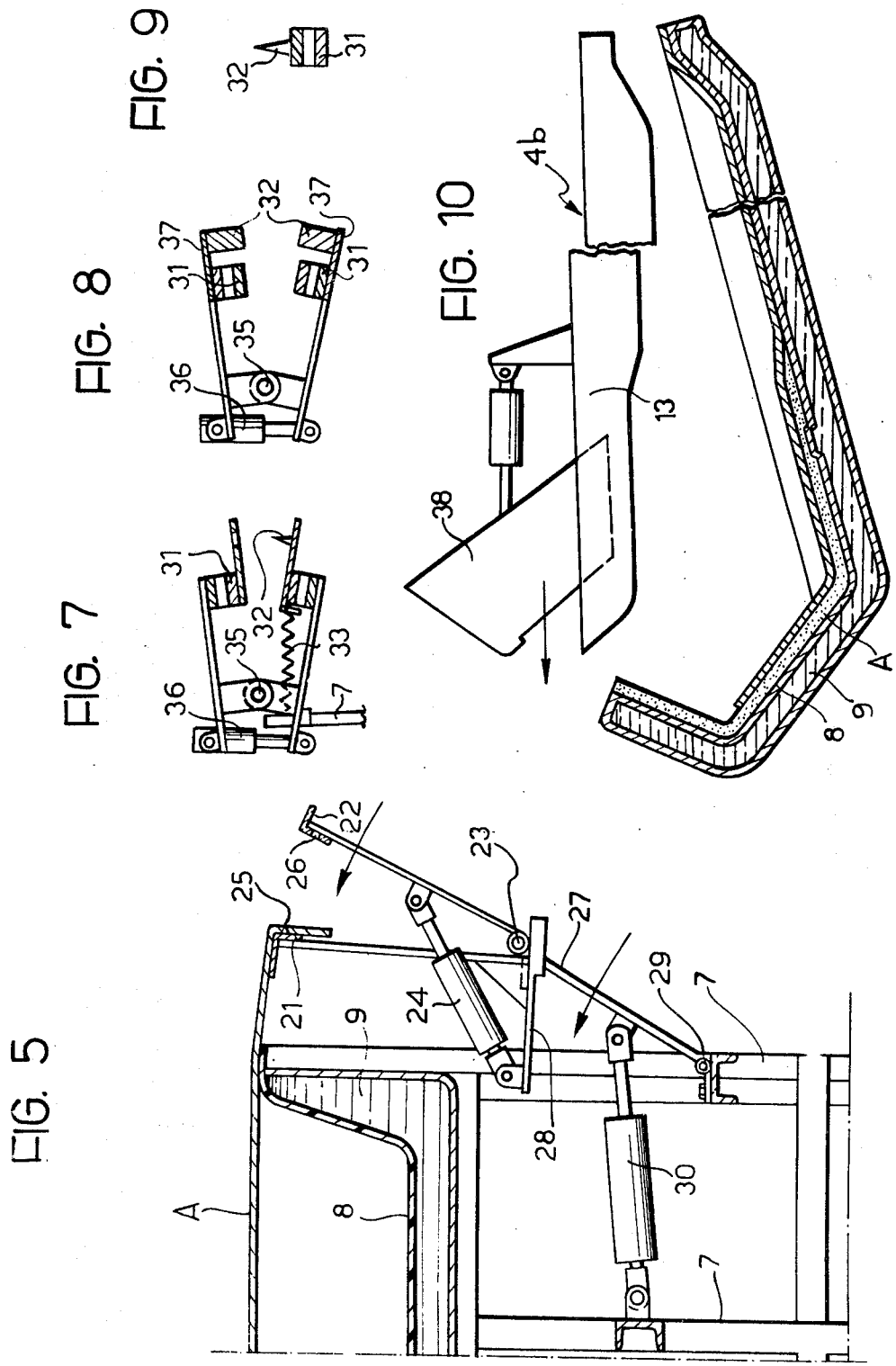

APPARATUS FOR SHAPING FLOOR COVERINGS FOR THE INTERIORS OF VEHICLES

BACKGROUND OF THE INVENTION

The present invention relates to apparatus for shaping (which may be referred to as moulding) floor coverings for the interiors of vehicles, the apparatus comprising a plurality of operator-controlled presses for hot-shaping the floor coverings to impart thereto a three-dimensional shape.

In general, such apparatus is known, and suitable presses are disclosed in U.S. Pat. Nos. 3,635,629 and 3,078,516. The floor coverings are particularly, but not necessarily, for the front and/or rear of a motor car interior or for the cab of a lorry. The floor covering preferably has a textile top surface, such as a boucle or pile carpet, and a backing which is a layer of thermoplastic resin, the unshaped floor covering being deformable when heated. Normal practice is to take the unshaped floor covering, which would be a flat slab or sheet, heat the unshaped floor covering and then place the floor covering in a press. Normally, the press must be closed fairly slowly to enable the floor covering to be distorted into the proper shape, and the floor covering must be kept in the press until it has cooled down enough for further handling. In addition, it is normal to trim the edges of the floor covering while it is in the press and to make holes in the floor covering, for instance for gear and brake levers and for seat attachments, by passing hot tools of suitable cross-sectional shape through the floor covering, and, if necessary, by cutting the floor covering with cutting tools.

The floor covering must therefore be a relatively long time in the press, and it is normal practice to have a number of presses served by a single heater, and for instance there could be a single oven or furnace for heating the tools used to form the holes in the floor coverings. Nonetheless, the arrangement involves fairly long transportation distances between the heater and at least some of the presses and between the oven or furnace and at least some of the presses, and requires a relatively large amount of operator time.

OBJECT OF THE INVENTION

It is an object of this invention to provide an apparatus which requires less operator time for the same throughput.

THE INVENTION

According to the invention, the apparatus comprises a vertical axis turntable mounting the presses and capable of carrying operators for attending to the presses, means for rotating the turntable at a slow speed, a station at which unshaped floor coverings are supplied to the turntable and a station at which shaped floor coverings are removed from the turntable.

ADVANTAGES OF THE INVENTION

The use of the turntable means that the heater can be positioned at or adjacent the supply station, and the floor coverings need only be transported through a short distance when inserting them into the presses. Likewise, the removal station can be adjacent a store for the shaped floor coverings or adjacent the place where further processing is carried out. Furthermore, if the oven or furnace is used for heating tools for forming holes in the floor coverings, the oven or furnace can be adjacent the the removal station can be adjacent a store for the shaped floor coverings or adjacent the place where further processing is carried out. Furthermore, if the oven or furnace is used for heating tools for forming holes in the floor coverings, the oven or furnace can be adjacent the position the presses reach when this operation is carried out. In one plant, it has been found that the incorporation of the turntable increased production rates fourfold, that is to say using the same presses, the same heater and the same oven or furnace, as well as the same personnel, four times in number of floor coverings were shaped per hour.

Various apparatuses are known having a rotary member carrying presses or moulds. For instance, there is a turret machine having a plurality of moulding heads for moulding small plastic articles, mounted on a central rotary column; there is a machine where a plurality of presses for moulding foamed plastic slabs are interconnected and mounted to form a rotary assembly; and there is a machine where the lower dies of a plurality of vacuum-forming presses are mounted on a turntable. However in all these apparatuses, the individual presses or moulds are not operator attended, and the rotary member does not have a flat top surface, is well above factory floor level and is highly unsuitable for carrying operators during normal operation of the apparatus.

The rotary distributor on the axis of the turntable for connecting a stationary supply of the pressure fluid to the actuators of the presses considerably simplifies the supply of the fluid, and thereby facilitates and makes more economic the incorporation of the turntable.

During mould closure, the edge portions of the floor covering must be strongly retained in order to avoid the formation of creases or folds in the floor covering, and normal practice is to do this manually, by having a number of operators pulling on the edge portions of the floor covering. However at least one of the presses can have along at least two opposite sides thereof means for engaging the respective edge portions of the carpet and applying substantial tension thereto during press closure. It has been found highly beneficial to use smooth-faced jaws as engaging means, for gripping the edge portions of the carpet, the arrangement including means for applying a predetermined gripping force to the jaws such that the carpet is drawn between the jaws during press closure.

To avoid mechanical complexity and also to ensure good operator access to the press before press closure, the jaws or other engaging means are preferably mounted on only one of the dies of the press.

BRIEF DESCRIPTION OF THE DRAWINGS

The invention will be further described, by way of example, with reference to the accompanying drawings, in which:

FIG. 4 is a section along the line IV—IV of FIG. 3;

FIG. 5 is a vertical section through part of another press on the turntable, illustrating a different arrangement for applying tension to the floor covering during press closure;

FIG. 6 is a top view of the female die of yet another press on the turntable, illustrating another arrangement for applying tension to the floor covering during press closure;

FIG. 7 is a vertical section along the line VII—VII of FIG. 6;

FIG. 8 corresponds to FIG. 7, but shows another arrangement for gripping the floor covering;

FIG. 9 corresponds to FIG. 7, but shows yet another arrangement for gripping the floor covering;

FIG. 10 is a schematic vertical section through part of a further press; and

DESCRIPTION OF ONE EMBODIMENT OF THE INVENTION

Figure 1:
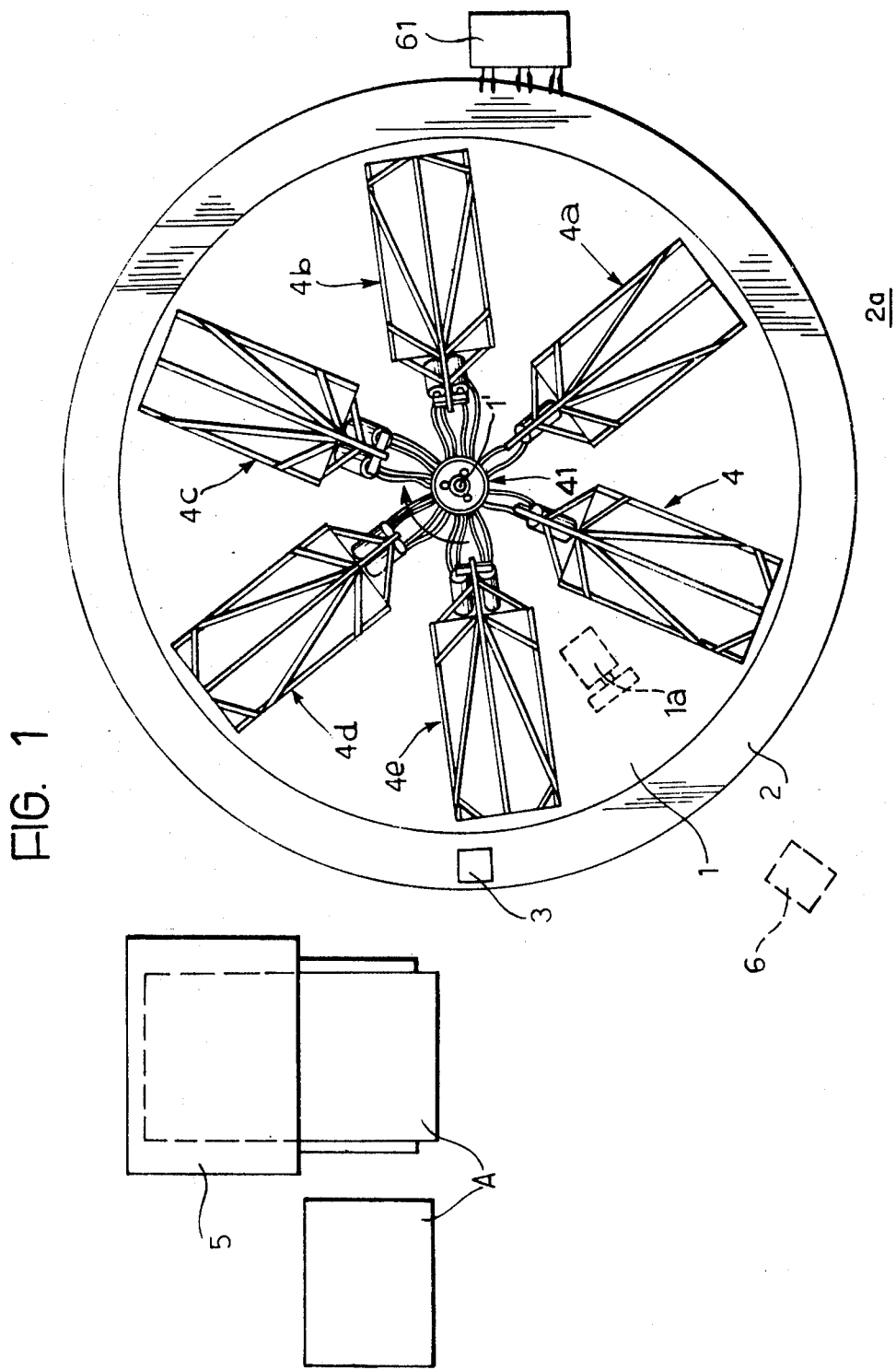
FIG. 1 is a schematic plan view of the apparatus in accordance with the invention.
Figure 3:
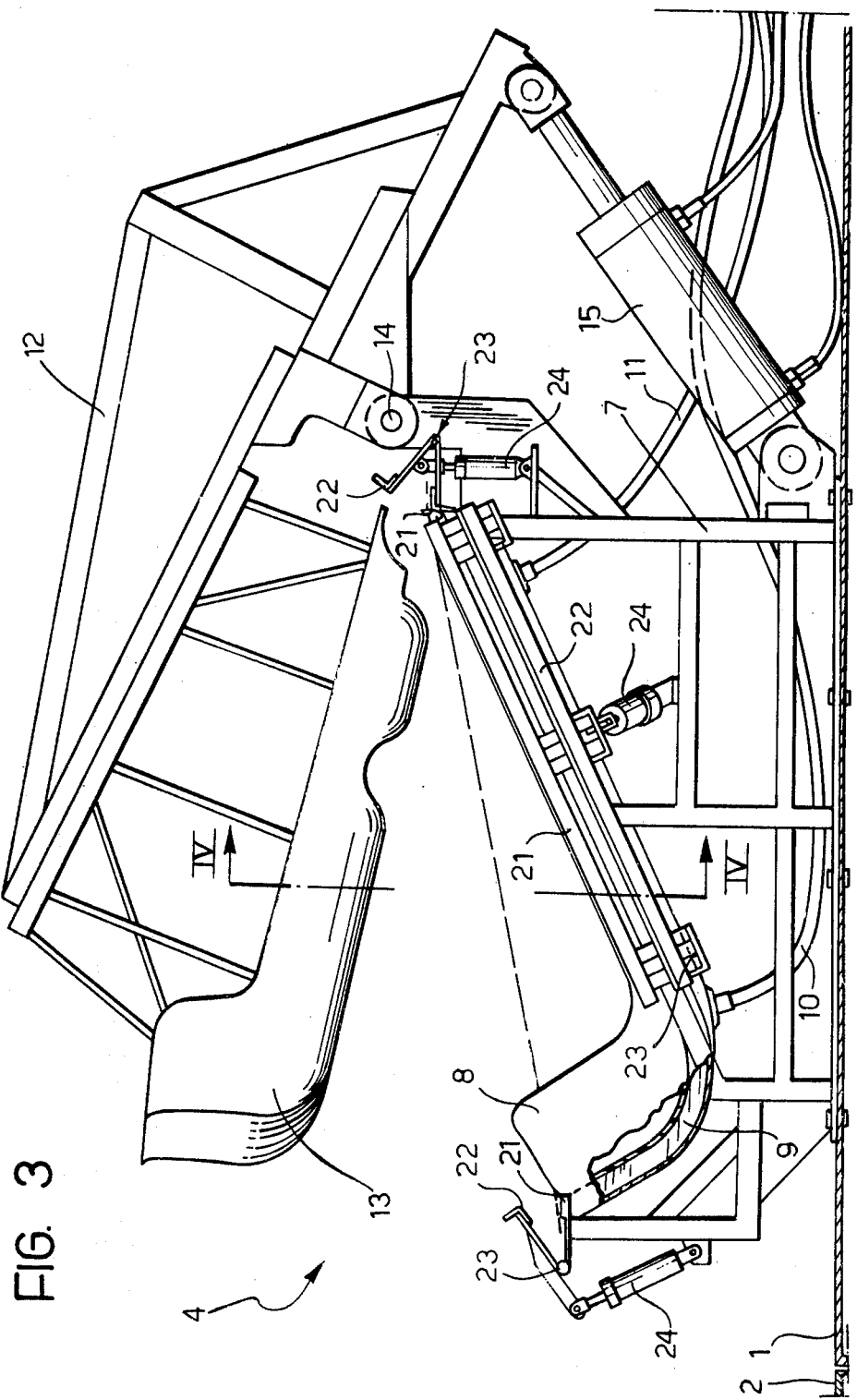
FIG. 3 is a side view of the press of FIG. 2, a small part being shown in vertical section.

The general layout of the apparatus is shown in FIG. 1. There is a large diameter carousel or turntable 1 rotatable about a vertical axis 1' having a flat or planar top surface 1 which is level with the factory floor and which is surrounded by a stationary ring 2 fixed to, level with and forming part of the factory floor (FIG. 3). However, in practice, it is found that the turntable 1 could be one step up from or one step down from the factory floor, provided operators can step on and off the turntable 1 without difficulty. Any suitable arrangement can be used for supporting and driving the turntable 1. For instance, there can be a vertical stub axle fixed to the floor beneath the turntable 1 and rings of wheels rotatably mounted on the bottom of the turntable 1 and running on fixed tracks beneath the turntable 1, some of the wheels being driven to rotate the turntable. The driving motor (indicated schematically at 1a) or motors can be electric motors mounted on the turntable 1, and powered through brushes and contact rings on the axis of the turntable (below the distributor referred to below). The turntable 1 can for instance have a peripheral speed of 200 to 250 meters per minute, and its motion will be an intermittent motion controlled by an operator using a stationary manual controller 3. In practice, it is found that the turntable 1 rotates once every six and a half or seven minutes.

The turntable mounts a number of presses 4, 4a, . . . for hot-shaping floor coverings A to impart thereto a three-dimensional shape. The presses can all be different, or could all be the same, the types of presses depending upon the program of work. Different types of presses are illustrated in FIGS. 2 to 4, FIG. 5, FIGS. 6 to 9 and FIG. 10. There is a station at which unshaped floor coverings A are supplied to the turntable 1, the station being represented by a stationary infra-red heater 5 adjacent the turntable 1, and there is a station 6 at which shaped floor coverings A are removed from the turntable 1, which station can merely be a part of the factory floor from which the floor coverings A are removed for storage or further processing.

Figure 2:
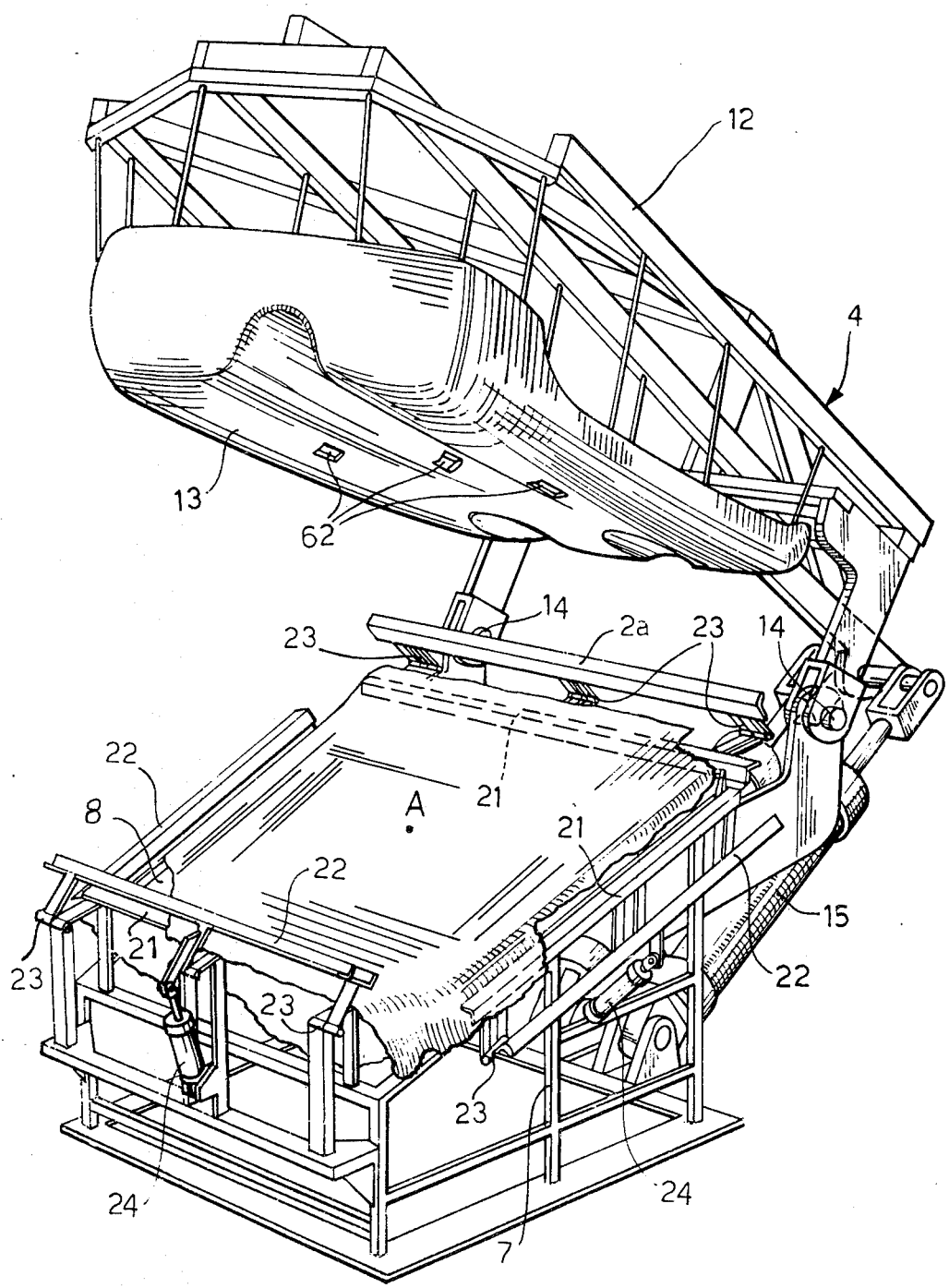
FIG. 2 is a perspective view of one of the presses on the turntable of the apparatus, illustrated in the open position.

Each press 4, 4a, . . . includes a lower part having a support frame work 7 and a female die 8. The female die 8 of each press 4, 4a, . . . is preferably provided with a jacket 9 for the circulation of a coolant or heating fluid (normally a liquid), according to whether the floor covering A is to be cooled or heated in the press, the jacket 9 being connected to supply and return pipes 10 and 11 (see FIGS. 3 and 5). Each press 4, 4a, . . . also includes an upper part having a support framework 12 and a male die 13. As shown in FIGS. 2 and 3, the upper part of the press can be hinged to the lower part by means of pins 14 and the closing and opening movement of the press is controlled by means of at least one pressure fluid actuator 15 which is pivoted to the lower support framework 7 and to the upper support framework 12 in any suitable manner. Thus the mechanical pressure of the dies on press closure is used to deep form the floor covering A.

Depending upon the shape of the floor covering A to be formed, and therefore upon the shape of the female and male dies 8, 13, the presses 4, 4a, . . . can have along at least two opposite sides thereof means for engaging the respective edge portions of the floor covering A and applying substantial tension thereto during press closure, though such is not essential because for simple shapes operators standing alongside the press 4, 4a, . . . can hold the floor covering A in tension along all sides of the press or along said two opposite sides of the press. Nonetheless, it is found that the engaging and tensioning means can improve the consistency of the product, and also require less skilled personnel.

In the case of the press of FIGS. 2 to 4, the engaging means comprise smooth-faced jaws 21, 22. The jaws 22 are in the form of angle sections extending along the respective sides of the press, fixed to the female die 8, and the jaws 22 are pivotally connected to the jaws 21 by means of hinges 23. Thereby, both jaws 21, 22 are mounted on the female die 8. If desired, the jaws 21, 22 could be provided with cooperating spikes and holes as shown in FIG. 5, but this is not preferred. The motion of the jaws is controlled by pressure fluid actuators 24 connected to the lower support framework 7 and the jaws 22 in any suitable manner. In the preferred construction, the actuators 24 apply a predetermined gripping force to the jaws 21, 22, and the force is such that the floor covering A is drawn between the jaws 21, 22 during press closure, while still applying substantial tension to the floor covering A. In this manner, those parts of the covering A which need to be drawn in a long distance for deep pressing can move sufficiently through the jaws 21, 22. For setting up the press, the force applied by the actuator 24 can be adjusted in any suitable manner. It can be seen that the jaws 21, 22 at the sides of the press have gripping surfaces which are right angles to the direction in which the edge portions of the floor covering A are drawn during press closure whereas the jaws 21, 22 at the ends of the press have gripping surfaces in the plane in which the edge portions of the floor covering A are drawn. It is found that having the gripping surface at right angles to the direction of drawing gives somewhat better control of the tension applied to the floor covering A.

The engaging means shown in FIG. 5 have some components which are generally similar to those in FIGS. 2 to 4, and the same reference numerals are used for such components. However, the jaws 21, 22 have respective spikes 25 and holes 26 so that the jaws 21, 22 engage the floor covering A without slippage on press closure. None the less, the jaws 21, 22 are bodily movable towards the press against a biasing force on press closure. To achieve this, the hinges 23 are themselves mounted on pivoted levers 27 which carry a bracket 28 for the pivotal mounting of one end of the actuator 24 and are pivoted to the lower support framework 7 by pivots 29. The tension applied to the floor covering A by the jaws 21, 22 is controlled by means of a cylinder 30 which is articulated to the lower support framework 7 and to the respective lever 27; the cylinder 30 can be in the form of a hydraulic damping cylinder, and either can be arranged to provide a constant force for the whole of its stroke, or can be arranged to provide a relatively light force for the first part of its stroke, followed by a relatively heavy force for the second part of its stroke. It will be seen that as the press is closed, the jaws 21, 22 and their pivot axis or hinges 23 are drawn towards the press on press closure, against the force of the cylinder 30. The cylinder 30 could be replaced by any other suitable arrangement, for instance a long-stroke helical compression spring or a lever arrangement and a tension spring.

The engaging and tensioning means of FIGS. 6 to 9 comprise a flexible member formed by at least one chain 31 which extends along the respective side of the press. The chain or chains 31 can be continuous all the way round the press, but there are preferably interruptions at spaced intervals, as shown in FIG. 6. The or each chain 31 is of the type having flexibility in one plane (the plane of the drawing in the case of FIG. 6) and substantially no flexibility in the plane at right angles thereto, and the chains 31 illustrated are in the form of alternate double and single links which are pivoted to each other. In each case, the chain or chains 31 have closely adjacent grippers 32 for gripping the edge portions of the floor covering A and identical tension springs 33 which bias the grippers 32 in a direction away from the press, the tension springs 33 being connected to the lower support framework 7.

Mounting the grippers 32 closely adjacent one another avoids excessive withdrawal into the press of those parts of the floor covering A which are between grippers 32, and the use of the chain or chains 31, which actually mount and support the grippers 32, is a cheap arrangement for providing a large number of closely-spaced grippers, and also provides some control of the withdrawal into the press of the floor covering A, the position of each gripper 32 being affected by the positions of the adjacent grippers 32.

In the arrangement shown in FIGS. 6 and 7, there are two parallel, closely adjacent chains 31 having elements which engage the floor covering A between them, in this particular case the elements being spikes and cooperating holes on small strips 34 which are welded to and project from the adjacent sides of the respective chains 31. At spaced intervals, the chains 31 are pivotally interconnected about a pivot axis 35 generally parallel to the direction in which the chains 31 extend, and a small pressure fluid actuator 36 is provided for moving the chains 31 apart and for holding the chains 31 together to engage the floor covering A.

In the case of the variant of FIG. 8, the spikes and holes of FIG. 7 are replaced by elements in the form of pressure pads secured to small strips 37 welded to and projecting from the remote sides of the respective chains 31, the constructions being otherwise the same. The actuator is preferably sufficiently powerful to prevent the floor covering A slipping between the gripping elements on press closure.

FIG. 9 shows a third variation, where there is just a single chain 31, the grippers 32 being in the form of spikes welded to the links of the chain. If there is difficulty in placing the floor covering over the spikes, the floor covering can be knocked into place with a mallet.

FIG. 6 shows that as the press is closed, more floor covering A is drawn in at some places than at other places, and the springs 33 apply the requisite tension.

FIG. 10 is a schematic illustration of another press, the only parts of the press which are shown being the female die 8, the jacket 9 and the male die 13. Engaging and tensioning means may be provided around the female die 8, as in any one of the presses of FIGS. 2 to 9. The press of FIG. 10 has a two-part closing motion, and the male die 13 has a subsidiary die part 38 and a pressure fluid actuator (indicated at 39) for moving the subsidiary die part 38 radially with respect to the pivotal closure motion of the male die 13. During press closure, the male die 13 is brought down into the female die 8 in a first part of the closure motion, and the subsidiary die part 38 is moved radially into the undercut part of the female die 8 during a second part of the closure motion. In this manner, the floor covering A can be formed in an "undercut" shape, as shown in FIG. 10.

Figure 11:
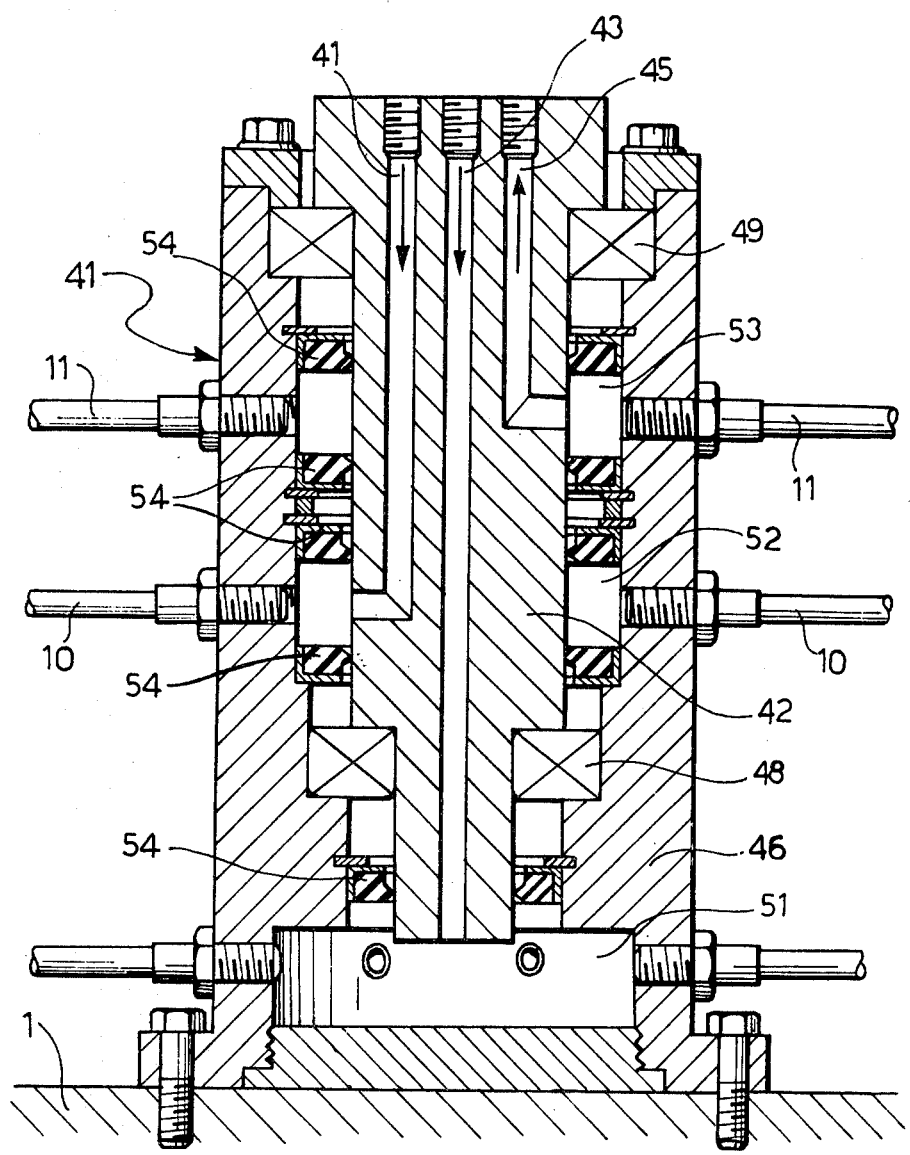
FIG. 11 is a schematic vertical section through a rotary distributor on the axis of the turntable.

All the fluid pressure actuators which effect the press closure and opening, and also the operation of the floor covering engaging means, receive pressure fluid (normally air) from a single rotary distributor 34 which is illustrated in FIG. 11. Furthermore, the supply and return pipes 10 and 11 for coolant or heating fluid are connected to the rotary distributor 41. The distributor 41 has a central, stationary core 42 in which have been bored three adjacent ducts 43, 44 and 45 for the supply of pressure fluid, the supply of coolant or heating fluid and the return of coolant or heating fluid, respectively.

In practice, the ducts 43, 44 and 45 can be equispaced about the axis of the central core 42. It will be appreciated that, by suitably altering the construction, the number of ducts can be changed. For instance, in a simple construction, there could be a single duct for the supply of pressure fluid, or the number of ducts could be greater than three. The central core 42 has unions at its top end for connecting the ducts 43, 44 and 45 to respective pipes in turn connected respectively to a stationary source of pressure fluid and to the supply and return of a cooler or heater. The central core 42 is suspended from a stationary structure above the turntable 1, e.g. a roof beam of the factory building, by means of the pipes.

In detail, the central core 42 is slightly conical and has two steps. Around the central core 42, and fixed to the turntable 1, there is an outer casing 46 journalled on the central core 42 by means of spaced radial bearings 48 and 49.

An axial bearing can be incorporated if necessary, with suitable modification of the structure, but normally the radial bearings 48 and 49 provide sufficient axial location for the small axial forces expected in operation.

As can be seen, the outer casing 46 defines three axially-spaced annular chambers 51, 52 and 53, which annular chambers are connected respectively to the pressure fluid actuators of the presses, to the supply pipes 10 and to the return pipes 11. Each annular chamber 51, 52 and 53 is sealed to the central core 42 by means of annular seals 54 of conventional construction, and radial bores are provided in the central core 32, connecting the respective ducts 44 and 45 to the annular chambers 52 and 53.

FIG. 1 indicates a furnace or oven 61 adjacent the turntable 1, for heating tools used to form holes in the floor coverings A while the floor coverings are in the respective presses 4, 4a, . . . The tools, which have a cross-section corresponding to the shape of the hole to be formed, are heated up to 300° to 400° C, or even up to red heat, and are passed down through correspondingly shaped holes 62 in the male die 13 (see FIGS. 2 and 4), through the floor covering A and, preferably, into holes or recesses 63 in the female die 8.

The operation of the apparatus will be explained by means of one specific example.

EXAMPLE

The floor covering A can be a felt, boucle or tufted carpet, for instance made of nylon or a polyester, such as a carpet having a nylon pile woven into a 50:50 ww nylon: polyester base of felt construction.

A polyethylene film is adhered to the bottom of the carpet by sprinkling polyethylene powder on the bottom of the carpet, heating the powder to melting point and applying the film. The composite floor covering is then cut to rough size, is placed in the heater 5 by hand, and is heated to about 80° or 90° C. While the turntable 1 is stationary, the floor covering A is removed from the heater 5 by hand and is inserted into the adjacent press (i.e. the press 4e in FIG. 1). The rotary motion of the turntable is initiated, using the controller 3. If present, the jaws 22 are closed to clamp the edge portions of the floor covering A against the jaws 21, using an operator controlled valve mounted on the press itself, and, using another operator-controlled valve mounted on the press, the closure motion of the press is initiated. If there are no jaws 21, 22, or no jaws along any of the sides of the floor covering A, the respective edge portions of the floor covering A are held by hand to apply sufficient tension thereto to avoid the formation of creases or folds. The projecting parts of the floor covering A are trimmed off around the edges of the press, and holes are formed in the press using the tools heated in the furnace or oven 61, the press in question being adjacent the furnace or oven 61 at this stage; larger holes can be cut in the floor covering A using a cutter, the larger holes being delineated by registering apertures in the female and male dies 8, 13. Meanwhile, the floor covering A is being cooled down by cold water passed through the jacket 9, and by the time the press in question reaches the removal station 6, the floor covering A is cooled down to 40° to 30° C and is set in its new shape. The press is opened and the shaped floor covering A is removed from the press and taken off the turntable 1.

During this operation, the other presses on the turntable 1 will have been loaded and attended to by the requisite personnel. The personnel are able to stand on the turntable 1 beside the presses 4, 4a, ... , and the speed of rotation of the turntable 1 is sufficiently slow for the operators to step on and off the turntable 1 without stopping the turntable 1.

The details of the embodiment described above with reference to the accompanying drawings and of the example described above may be extensively varied without departing from the scope of the present invention. For instance, as indicated in FIG. 10, the floor covering A may have had a layer of acoustic and/or thermal insulation applied thereto before insertion into the press.

I claim:

1. On a factory floor, apparatus for shaping floor coverings for the interiors of vehicles, the apparatus comprising:
    a turntable rotatable about a vertical axis, the turntable having a flat top surface for carrying operators, which top surface is not more than one step up or down from the factory floor;
    means for rotating the turntable at a slow speed;
    a plurality of operator-controlled presses mounted on the turntable, each press comprising a female die and a male die for hot-shaping the floor coverings to impart thereto a three-dimensional shape, and at least one pressure fluid actuator for closing the press;
    supply pipes for supplying pressure fluid to the actuators of the presses; and
    a rotary distributor on the axis of the turntable and connected to the pressure fluid supply pipes for the press actuators, for connecting the supply pipes to a stationary supply of pressure fluid;
    whereby unshaped floor coverings can be supplied to the turntable from one station, be shaped by the presses while the turntable rotates, and be removed from the turntable at another station.

2. Apparatus as claimed in claim 1, wherein at least one of the presses comprises at least one liquid-cooled or liquid-heated die, the die being connected to the rotary distributor by supply and return pipes, and the rotary distributor being for connecting the die to a stationary supply and a stationary return of the coolant or heating liquid.

3. Apparatus as claimed in claim 1, wherein the turntable is mounted on a factory floor and the distributor is suspended from above the turntable.

4. Apparatus as claimed in claim 1, wherein there is adjacent the turntable heating means for heating tools for forming holes in the floor coverings while the floor coverings are in the respective presses.

5. Apparatus for shaping floor coverings for the interiors of vehicles, the apparatus comprising a plurality of operator-controlled presses each of which has a female die and a male die for hot-shaping the floor coverings to impart thereto a three-dimensional shape and means for closing the dies, at least one of the presses having along at least two opposite sides thereof means for engaging the respective edge portions of the floor covering and applying substantial tension thereto during press closure, the engaging means comprising smooth-faced jaws positioned adjacent only one of the dies, for gripping the edge portions of the floor covering, the apparatus further comprising means for applying a predetermined gripping force to the jaws, whereby said force can be predetermined such that the floor covering is drawn between the jaws during press closure.

6. Apparatus as claimed in claim 5, wherein the jaws have gripping surfaces which are at right angles to the direction in which the edge portion of the floor covering is drawn during press closure.

7. Apparatus for shaping floor coverings for the interiors of vehicles, the apparatus comprising a plurality of operator-controlled presses each of which has a female die and a male die for hot-shaping the floor coverings to impart thereto a three-dimensional shape and means for closing the dies, at least one of the presses having along at least two opposite sides thereof means for engaging the respective edge portions of the floor covering and applying substantial tension thereto during press closure, the engaging means engaging the floor covering without substantial slippage on pressure closure and comprising a respective flexible member which extends along the side of the press, a plurality of closely adjacent grippers mounted on the flexible member, and tension springs connected to the flexible member and biasing the flexible member and the grippers in a direction away from the press.

8. Apparatus as claimed in claim 7, wherein the flexible member comprises at least one link chain having flexibility in the plane in which the floor covering is drawn and substantially no flexibility in the plane at right angles thereto.

9. Apparatus as claimed in claim 8, wherein the flexible member comprises two said link chains, the chains being parallel and closely adjacent and the grippers being provided by gripper elements mounted on the chains and engaging the floor covering therebetween, the apparatus further comprising means for moving the chains apart and means for holding the chains together to engage the floor covering.

10. Apparatus as claimed in claim 9, wherein said means for moving the chains apart comprise means pivotally interconnecting the chains at spaced positions therealong, about pivot axes generally parallel to the direction in which the chains extend.

11. Apparatus as claimed in claim 1, wherein the female die or the male die of at least one of the presses comprises a subsidiary part movable at right angles to the main closure motion of the female and male dies, and actuator means for moving the subsidiary part relative to the remainder of the die, whereby the press has a two-part closure motion, the female and male dies being closed in a first part of the motion, and, in a second part of the motion, the subsidiary part of said at least one die being moved to complete the closure of the press.

* * * * *